United States Patent [19]

Phillips

[11] 4,245,421
[45] Jan. 20, 1981

[54] FISHING LURE

[76] Inventor: Paul R. Phillips, Rt. 1, Rowell La., Abrams, Wis. 54101

[21] Appl. No.: 66,820

[22] Filed: Aug. 15, 1979

[51] Int. Cl.³ ............................................. A01K 85/00
[52] U.S. Cl. ................................................... 43/42.47
[58] Field of Search ................ 43/42.47, 42.45, 42.36, 43/42.49, 42.15

[56] References Cited

U.S. PATENT DOCUMENTS

| | | | |
|---|---|---|---|
| 966,068 | 8/1910 | Williamson | 43/42.49 |
| 1,209,022 | 12/1916 | Phinney | 43/42.23 |
| 2,245,061 | 6/1941 | Wisniewski | 43/42.47 |
| 2,333,590 | 11/1943 | Schueller | 43/42.22 |
| 2,820,314 | 1/1958 | Scott | 43/42.1 |
| 3,152,419 | 10/1964 | Jones | 43/42.03 |
| 3,271,892 | 9/1966 | Sabrsula | 43/42.03 |
| 3,363,359 | 1/1968 | Oney | 43/42.47 |
| 3,702,035 | 11/1972 | Pope | 43/42.35 |
| 3,753,310 | 8/1973 | Werner | 43/42.47 |
| 3,805,436 | 4/1974 | Davis | 43/42.35 |
| 3,922,811 | 12/1975 | Ellington | 43/42.39 |
| 4,028,839 | 6/1977 | Stubblefield | 43/43.13 |
| 4,079,539 | 3/1978 | Holstein | 43/43.13 |

Primary Examiner—Nicholas P. Godici
Attorney, Agent, or Firm—Schwartz, Jeffery, Schwaab, Mack, Blumenthal & Koch

[57] ABSTRACT

A fishing lure having an action lip including side flanges and a front flange extending downwardly adjacent the front of the lure. The action lip permits downward planing of the lure and simultaneous side to side movement. A swivel arm rotates in an opening in the lure body, with the outer section of the arm being attached to the line. The arm swivels about an axis through the section of the arm positioned in the opening.

9 Claims, 6 Drawing Figures

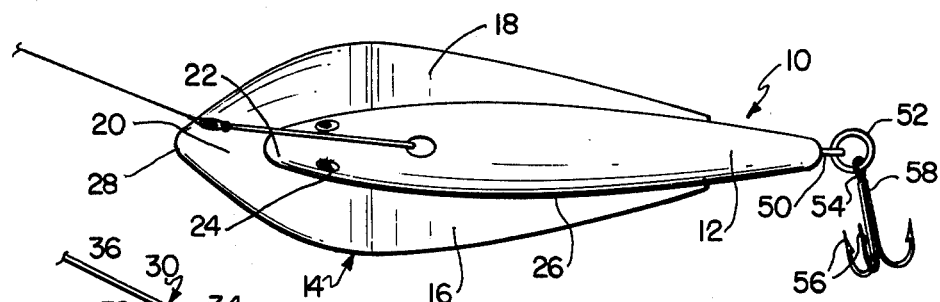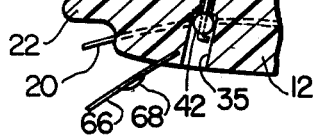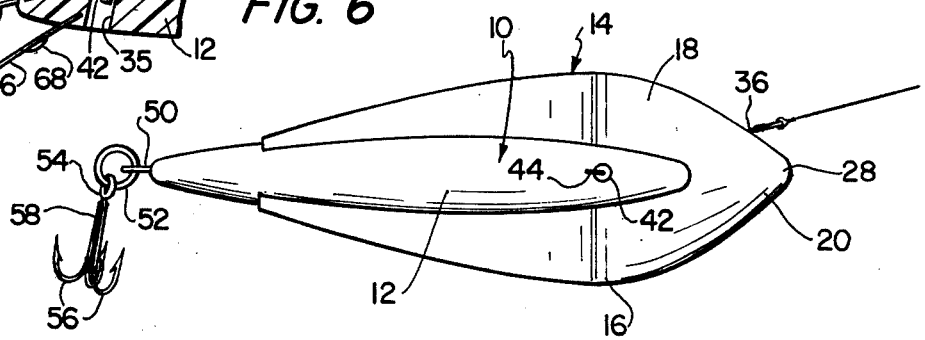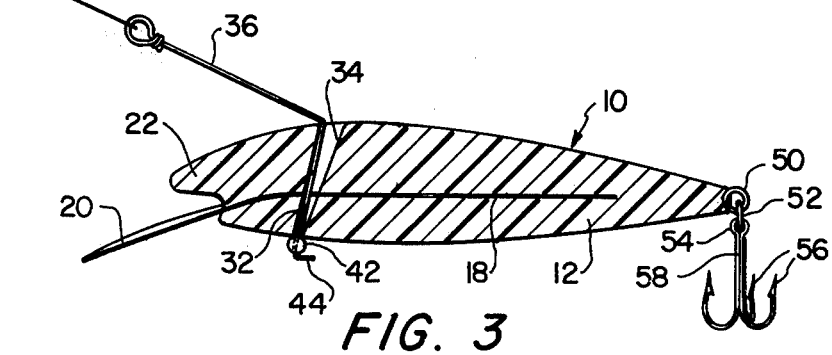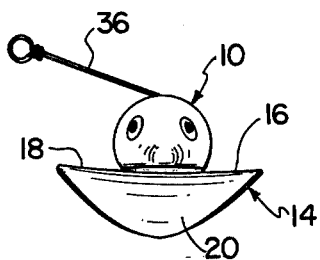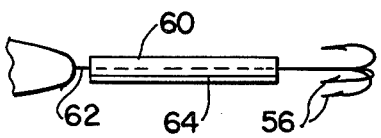

FISHING LURE

BACKGROUND OF THE INVENTION

The present invention relates as indicated to a fishing lure, and more particularly a fishing lure specifically designed to produce both upward and downward movement of the lure in water, as well as providing a wandering or erratic swimming action. As a result, the action of the lure closely simulates the action of live bait thereby enhancing the attractiveness of the lure to fish.

The prior art is replete with fish lures designed to provide movement of the lure in a manner to simulate as closely as possible the swimming action of live bait. All lures are commonly characterized by a connection to a fishing line, perhaps through a leader, and the provision of one or more hook assemblies. The prior art discloses numerous, diverse means of providing the desired simulation. U.S. Pat. No. 3,152,419 to R. J. Jones discloses a lure in which a cradle is operatively connected to the lure body and includes a downwardly extending tongue on which water impinges as the lure is pulled through the water, with the result being that the lure is caused to submerge in the water. Depending upon the slope of the tongue, the location of attachment of the leader and the speed with which the lure is pulled, the lure will move upwardly or downwardly in the water.

U.S. Pat. No. 3,702,035 to M. E. Pope discloses a lure also having a flat, generally triangular front surface downwardly disposed which is designed to provide rapid darting movement of the lure from side to side. The triangular shaped head is provided with side flanges designed to provide stability at the front of the lure. U.S. Pat. No. 2,333,590 discloses an artificial lure in which a vertical opening is formed relatively adjacent to the front of the lure into which a hook assembly is inserted. One of the hooks engages a rearwardly disposed recess thereby to stabilize the hook assembly so that a hook extends at either side of the lure. Additional hooks are also mounted relatively adjacent to the tail of the lure.

U.S. Pat. No. 3,271,892 to Sabrsula discloses a lure in which a rudder is provided pivotally connected to the lure body at a point generally intermediate the length thereof, with the rudder moving within defined side to side limits to provide the desired darting movement of the lure.

U.S. Pat. No. 3,805,436 relates to a fishing lure in which elements are secured in an essentially embedded position in the lure, with the elements being adapted to receive hook assemblies with the lure being generally curved along its length. The elements to which the hook assemblies are secured do not move relative to the body of the lure.

U.S. Pat. No. 1,209,022 to Phinney discloses an artificial lure having a series of fish hook assemblies secured to the underside thereof, with a wire bail member being pivotally attached to the lure at the front thereof. The bail member at the central portion thereof moves through grooves or channels formed in the lure body which provide a zig-zag motion of the lure when drawn through the water.

SUMMARY OF THE INVENTION

The fishing lure constructed in accordance with the present invention is principally characterized by its ability to plane downwardly and upwardly due to the construction thereof, and also dart from side to side in an erratic fashion thereby to simulate swimming action. In accordance with the invention, the lure is provided with an action lip which includes side flanges which extend a substantial distance along the length of the lure, and an integral downwardly inclined forward end portion which in one form of the invention extends substantially beyond the front tip of the lure body. In this manner, when the lure is in a generally horizontal position and being pulled through the water, water impinging on the forward portion of the lip will cause the lure to plane downwardly. The lure also darts sidewards due to the sloping of the forward end portion toward its curved tip.

The invention further includes a swivel arm, one section of which, in one invention form, extends downwardly through an opening provided therefor in the lure body, with the opposite end extending outwardly at an angle relative to the first arm section and being secured at its outer tip to a fishing line. The swivel arm is thereby able to move within the opening to either side of a vertical plane through the lure body thereby providing darting side to side movements of the lure. In addition, the opening in the lure body is of sufficient dimension relative to the diameter of the swivel arm which extends therethrough to provide a relatively loose fit thereby allowing the lure to wobble to even further simulate swimming action. As the lure planes downwardly as described, an obtuse angle is formed between the exposed section of the swivel arm and the fishing line attached to the end of such section thereby raising the lure until the downward planing movement produces sideward movement of the exposed section of the swivel arm relative to the lure body. The fishing line functions to return such section until it is generally parallel with the fishing line, also producing a side to side movement of the lure.

When the lure is used for trolling, the above noted action takes place, and when the lure is used for casting, the movement of the lure can be controlled by the speed of retrieval of the line. In this matter, the lure can be made to periodically break the surface of the water or can be permitted to move more deeply in the water. Periodic jerks of the tip of the rod will provide upward planing action, accompanied by side to side movements of the lure.

A further feature of the invention is to provide a lure which is difficult to bottom-snag. On impact, rotation of the swivel arm tends to bring the tail sections forward thereby sending the lure in a different direction away from the snag.

In accordance with another feature of the invention, a fish hook assembly is mounted on an eyelet at the tail of the lure, with the assembly being suspended for swinging movement relative to the tail thereby providing an additional destabilizing factor to enhance the darting of the lure from side to side. In accordance with a modification of the invention, separate additional tail sections can be provided, also having side flanges or fins, to provide further action or movement of the lure in the tail region thereof. When separate additional tail sections are provided, one or more fish hook assemblies can be provided at the end of the added section, or along the body of the lure as desired.

These and other objects of the invention will become apparent as the following description proceeds in particular reference to the application drawing.

BRIEF DESCRIPTION OF THE APPLICATION DRAWING

FIG. 1 is a top perspective view of the fishing lure constructed in accordance with the present invention;

FIG. 2 is a bottom perspective view of the fishing lure;

FIG. 3 is a vertical cross-section view through the fishing lure;

FIG. 4 is a front view of the lure, showing more clearly the inclination of the lip extending at the sides and front of the lure;

FIG. 5 is a modified form of the invention wherein an additional tail section is attached at the end of the lure; and FIG. 6 is a further modified form of the invention.

DETAILED DESCRIPTION OF THE PREFERRED EMBODIMENT

Referring now in more detail to the application drawing, wherein like parts are indicated by like reference numerals, the fishing lure constructed in accordance with the present invention is generally indicated at 10 and includes a body portion 12 which closely resembles the shape of live bait, and an action lip generally indicated at 14 which in the form shown extends longitudinally through the lure body. The lip 14 is imbedded in a longitudinal opening formed in the body at or slightly below a horizontal median plane through the body, and includes side flanges 16 and 18 and a front lip portion 20 which extends forwardly of the nose 22 of the lure body. The body is preferably formed with simulated eyes 24 and has a scale like surface 26 to more closely simulate feeding bait. As can be seen in FIGS. 1 and 2, the side flanges 16 and 18 of the lip 14 increase in width toward the front of the lure to a maximum width approximately outwardly of the simulated mouth and eyes of the lure, with the side flanges thereafter merging into the downwardly tapered front lip portion 20 of the lip 14. The latter terminates in a relatively blunt end 28. Due to the downward taper, the walls of the lip portion 20 are inclined relative to a horizontal longitudinal plane, which inclination results in a generally funnel shape configuration of the lip portion 20. The inclined walls produce a side to side darting of the lure.

A swivel arm generally indicated at 30 has a lower section 32 which, as best shown in FIG. 3, extends through an opening 34 provided therefor in the vertical longitudinal plane of the body 12, with the swivel arm further including an upper section 36 extending exteriorly from the top of the lure. The arm section 36 is shaped to form a ring or eye 38 to which the fishing line 40 can be secured in a well known manner. The bottom end of the lower section 32 of the swivel arm receives a spherical ball 42 having a diametrical opening to receive the wire, with the extreme bottom end of the wire section 32 being thereafter bent as shown in 44 to retain the ball in place and thereby prevent upward movement of the arm section 32 through the opening 34.

As shown in FIG. 3, the opening 34 extends at an angle relative to a central vertical axis through the lure body, with the outer arm section 36 being adapted to swing through a plane about an axis through the arm section 32. As shown in FIG. 3, the opening 34 is preferably larger than the diameter of the wire section 32 thereby permitting some degree of wobble of the wire in the opening 34. Although not critical to the concepts of the invention, the opening 34 is shown tapered toward a narrower diameter at the bottom thereof, thereby permitting greater movement of the section 32 at the top thereof.

It will be understood that the opening 34 need not extend entirely through the lure body as shown. It could terminate above the bottom surface of the body, with the wire section 32 being secured for rotation in such opening. Likewise, the opening 34 need not be tapered or circular in cross-section. A modified form of mounting the wire is shown in FIG. 6, to which specific reference is made hereinbelow.

A ring 50 is embedded or otherwise secured in the rear end of the lure, with a second ring 52 extending therethrough. The latter receives a fish hook assembly comprising a ring 54 which is looped through ring 52, and individual hooks commonly designated at 56 which are secured jointly as shown at 58 in the usual manner. The weight and configuration of the hook assembly provides some degree of instability to the lure, and thus facilitates the darting of the lure through the water.

As above noted, an important feature of the invention is the action lip 14, and particularly the downwardly directed front lip portion 20 thereof. By virtue of the taper and inclined side walls of the front lip section, the lure is planed downwardly and usually sidewardly as it moves through the water. As the downward inclination of the lure reaches a critical angle, determined by the downwardly inclination of the front portion 20 of the lip, the upward inclination of the arm section 36 of the pivot arm and the angle of the line 40 (which depends on the distance between the boat and the lure), upward pressure is exerted on the arm 36 through the line 40, and the lure turns upwardly. The upward movement continues until the planing surface assumes its FIG. 3, generally horizontal position. The planing surface is defined as the upper surface of the side flanges 16 and 18 of the lip 14 which are horizontal in the FIG. 3 orientation thereof.

The side flanges of the lip 14 serve not only as the planing surface against which the water can impinge during downward movements of the lure as above described, but provide a somewhat side to side wobbling effect thereby simulating swimming action. The relatively loose fitting of the arm section 32 of the swivel arm in the opening 34 also permits the lure to wobble which additionally adds to the instability of the lure to effect realistic swimming simulation.

The above described movement of the lure through the water is typical movement of the lure during trolling. Although the indicated, destabilizing factors are always present, there are several factors that will additionally influence the movement of the lure, for example, the weight of the fishing line 40, the length and angle of inclination of the upper arm section 36 of the swivel arm, the trolling speed, and the weights applied to the lure.

In addition to the upward and downward movement of the lure owing to the action lip as above described, the lure also darts sidewards due to the swivel arm 30 and more particularly the novel construction and mounting thereof relative to the body of the lure. When the lure is being pulled directly behind the boat, the line 40 and swivel arm 30 will be in essentially the same vertical plane. However, movement of the lure from side to side as described will cause the upper section 36 of the swivel arm to rotate around the axis of the lower arm section 32 as shown, for example, in FIG. 4. This will produce a slight canting of the lure in its direction of movement of the swivel arm which in turn will be counteracted by the water to return the lure to a position wherein the swivel arm 36 is generally in the same vertical plane as the body of the lure. In a similar manner, movement of the swivel arm 36 in the opposite direction past the vertical center arm will have the reverse effect, and as a result there is a darting side to side movement of the lure when the swivel arm section 36 passes to either side of the vertical plane through the lure body.

As previously indicated, the fish hook assembly affixed to the tail of the lure also provides instability due to the varying distribution of the weight of the assembly, and this adds to the side to side movement of the lure. To even further increase the movement at the tail of the lure, an additional lure section can be secured to the rear end of the lure. Referring to FIG. 5, a separate lure element 60 is mounted at the rear of the lure around wire 62, with the forward end of the wire being imbedded or otherwise secured to the rear end of the lure body. The wire 62 at its outer end is in the form of a fish hook assembly illustrated in FIGS. 1-3. The lure element 60 is provided with side flanges 64 comparable to side flanges 16 and 18 of the lip 14, with the flanges 66 likewise operating to provide wiggling movement of the lure element 60 and thereby further enhance the erratic movement of the lure through the water.

The action lip 14 is preferably inserted in the body 12 in a narrow slot provided therein, with the opening 34 being thereafter formed in the lure body and the lip. Alternatively, the side flanges 16 and 18 of the lip can comprise bifurcated arms extending on either side of a pre-formed opening 34. In either event, the lip 14 is secured in place by adhesive bonding or the like. A still further mounting arrangement comprises providing the flanges 16 and 18 of the lip with clips or tabs which extend into openings formed in the sides of the lure body. Such mounting arrangement is preferably augmented by bonding.

A modified form of action lip assembly is shown in FIG. 6, which comprises a fragmentary cross-section taken through the leading end of the lure. All structure illustrated in FIG. 6 which has been previously illustrated and described has been designated by the same reference numerals. In the FIG. 6 form, the opening 34 for the swivel arm 30 terminates approximately intermediate the heighth of the lure body in such section, and a counter-sunk opening 35 is formed from the bottom of the lure body. The spherical ball 42 is positioned in such opening 35, and the end of the arm section 32 extends through the ball and is turned, in the same manner as shown in FIG. 3. It should be noted that the counter-sunk opening 35 can be eliminated altogether provided that the arm section 32 can be mounted for rotation in the shortened opening 34 without permitting withdrawal of the arm 32 from the opening.

In the FIG. 6 form, the front lip portion 20 terminates just below the simulated mouth portion of the lure, and a separate lip member 66 is provided. The member is mounted in an opening provided therefor in the bottom of the lure body, and the member is preferably bonded in such opening. The lip member 66 can have a transverse dimension as desired, either comparable to the width of the side flanges 16 and 18 at approximately the longitudinal mounting point for the lip, or can be narrower. The lip member 66 preferably tapers from a greatest width at the mounting thereof to a generally blunt end, in much the same manner as the tapering of the front lip portion 20 of the action lip 14.

The action lip 66 is shown in FIG. 6 having a weight 68 mounted thereon, but it will be understood that the weight could as well be mounted on the front lip portion 20. Moreover, a similar weight can be mounted on the underside of the front lip portion 20 in the FIG. 3 form of the invention.

The provision of the separate action lip 66 provides yet a further variable to the movement of the lure through the water, thus enhancing the darting, side to side movement of the lure, and the downward and upward planing of the lure.

In addition to the structure shown, additional movement of the lure can be significantly effected by various weights, and particularly the placements of the weights of the lure body. Additional fish hooks assemblies can if desired be provided, for example, midway of the length of the lure body on the bottom thereof, and the novel action of the lip 14 due to the configuration thereof can be supplemented by additional lip sections placed advantageously on the lure body, for example, below the forward end 20 of the lip 14, as shown on FIG. 6, and perhaps at a different angle of inclination relative to the longitudinal axis of the lure. Still further, additional tail sections similar to the separate lure section 60 can be carried by the lure body, for the express purpose of providing a wandering and erratic swimming action instead of the conventional straight line action of normal lures.

A further advantage of the lure constructed in accordance with the present invention is that it is difficult to bottom-snag the lure. On impact, the swivel arm section 36 rotates thereby swinging the lure body relative to the arm section 36 resulting in the lure moving in a different direction to remove the snag.

I claim:

1. An artificial fishing lure adapted to be attached to a fishing line and pulled thereby through water, comprising:
    (a) an elongated lure body having a fish-like exterior configuration including a head portion, a tail portion, and an intermediate body portion there between;
    (b) an action lip extending longitudinally from a position adjacent said head portion at least to said intermediate portion, said action lip being in a plane approximately at or slightly below a horizontal median plane through said body, said lip comprising side flanges which extend laterally from the sides of said body to form planing surfaces, and a front portion integrally formed with said side flanges, said front portion tapering in width from a maximum width at the juncture with said side flanges to a minimum width at the extreme front end thereof, said front portion also tapering downwardly whereby the extreme front end thereof is in generally the same plane as the bottom of said body, said front portion serving as a further planing surface and causing said lure to submerge in the water when the lure body is pulled by the line while in a generally horizontal position in the water;
    (c) an opening formed in said intermediate body portion;
    (d) a swivel arm comprising a first section loosely positioned in said opening and a second section integrally formed with said first section and extending exteriorly of said body at an angle relative to said first section, the outer end of said second section being connected to a fishing line, said second section being rotatable about the axis of said first section so as to move the outer end of said second section to which said line is attached to either side of a vertical longitudinal plane through said body, and (e) hook means operatively associated with said lure body, whereby, said lure, by virtue of said action lip and said swivel arm, is capable of rapid upward, downward and sideward movement thereby to closely simulate the swimming action of live bait.

2. The artificial lure of claim 1 wherein said opening formed in said intermediate body portion of said lure extends entirely therethrough and is oriented downwardly and forwardly relative to the vertical, with the first and second sections of said swivel arm being approximately at right angles relative to each other.

3. The artificial lure of claim 2 wherein said opening is of greatest diameter at the top thereof, tapering to a smaller diameter at the bottom of said opening.

4. The artificial lure of claim 1 wherein said side flanges taper in width, with said flanges being the greatest in diameter at the merge point with said front portions of said action lip, and gradually tapering rearwardly therefrom to the terminal point of said side flanges.

5. The artificial lure of claim 1 wherein said hook means comprises a hook assembly attached at the tail end of said lure, the mounting of said hook assembly affording movement thereof relative to the body of the lure whereby said hook assembly can swing from side to side and enhance the erratic movement of the lure through the water.

6. The artificial lure of claim 1 where the walls of said front portion taper downwardly and inwardly toward the extreme front end thereof thereby to provide a generally funnel shape configuration, with the inclined sidewalls producing a darting, side to side movement of the lure.

7. The artificial lure of claim 1, further including means for retaining said swivel arm on said body, said retaining means comprising a generally spherical ball provided with a opening through which the lower end of said first section of said swivel arm extends, the diameter of said ball being larger than the diameter of said opening at the bottom of said body, with the extreme lower end of said first section being crimped or turned to retain said ball in place.

8. The artificial lure of claim 1 further including a separate tail section carried at the rear of the lure body, said separate tail section being rotatably mounted on a wire secured to said lure body, and being provided with side flanges extending laterally from the body of the tail, the wire around which said separate tail section is rotatably mounted being provided with a fish hook assembly at the outer end thereof.

9. The fishing lure of claim 1 further including a second action lip mounted on the under side of said lure body and extending forwardly and downwardly therefrom, said second action lip supplementing the downward planing of said lure body.

* * * * *